US007921811B2

(12) United States Patent
Bosserdet, Jr. et al.

(10) Patent No.: US 7,921,811 B2
(45) Date of Patent: Apr. 12, 2011

(54) SELECTIVE ACCESS ELECTRONICS PET DOOR

(75) Inventors: James R. Bosserdet, Jr., Old Fort, TN (US); Thomas P. Bjorholm, Knoxville, TN (US); George M. Smart, IV, Knoxville, TN (US); Andrew S. Grimmett, Athens, TN (US); Lane Whiteside, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 12/783,090

(22) Filed: May 19, 2010

(65) Prior Publication Data

US 2010/0218427 A1 Sep. 2, 2010

Related U.S. Application Data

(63) Continuation of application No. 11/971,553, filed on Jan. 9, 2008, now Pat. No. 7,798,103.

(60) Provisional application No. 60/888,526, filed on Feb. 6, 2007.

(51) Int. Cl.
*A01K 1/03* (2006.01)

(52) U.S. Cl. ........................................................ 119/501

(58) Field of Classification Search .................. 119/501, 119/416, 481, 492, 498
See application file for complete search history.

(56) References Cited

U.S. PATENT DOCUMENTS 5,185,954 A * 2/1993 Waddle, Sr. ..................... 49/168
5,946,855 A * 9/1999 Miconi ........................... 49/163

* cited by examiner

*Primary Examiner* — Thomas Price
(74) *Attorney, Agent, or Firm* — Pitts & Brittian, PC

(57) ABSTRACT

Described is an electronic pet door for automatically granting a selected animal access to a through-way defined by the electronic pet door and denying a non-selected animal access to the through-way. The selected animal carries a transmitter. The electronic pet door includes a corresponding receiver and a frame that defines the through-way, which has a tapered contour. A flap, which has a tapered contour corresponding to the through-way, is disposed within the through-way and is capable of a locked position and an unlocked position. When in the locked position, the flap denies access to the through-way. When unlocked, the flap grants an animal access to the through-way. The flap is locked and unlocked by way of a locking mechanism that shifts the flap longitudinally between the less tapered and most tapered portions of the through-way. The locking mechanism shifts the flap in response to the receiver.

1 Claim, 16 Drawing Sheets

SELECTIVE ACCESS ELECTRONICS PET DOOR

CROSS-REFERENCE TO RELATED APPLICATIONS

This application is a continuation of U.S. application Ser. No. 11/971,553, filed Jan. 9, 2008, which claims the benefit of U.S. Provisional Application No. 60/888,526, filed Feb. 6, 2007.

STATEMENT REGARDING FEDERALLY SPONSORED RESEARCH OR DEVELOPMENT

Not Applicable

BACKGROUND OF THE INVENTION

This invention pertains to a pet door for granting an animal access to a through-way defined by the pet door. More particularly, this invention pertains to an electronic pet door for automatically granting a selected animal access to the through-way and automatically denying a non-selected animal access to the through-way.

BRIEF SUMMARY OF THE INVENTION

In accordance with the various features of the present invention there is provided an electronic pet door for automatically granting a selected animal access to a through-way defined by the electronic pet door and denying a non-selected animal access to the through-way. The electronic pet door includes a frame and a flap. The frame defines the through-way and an engagement shoulder. The through-way has a tapered contour and is substantially large to the extent that it provides a passage for an animal. The flap has a tapered contour that corresponds to the tapered contour of the through-way and defines an engagement slot. The flap is secured to a locking mechanism, which is housed by the frame, by way of a hinge member such that the flap is disposed within the through-way and pivots between an open position and a closed position in response to a lateral force applied at the flap. At the open position, the flap pivots at the hinge member such that the engagement slot defined by the flap is not aligned with the engagement shoulder defined by the frame. At the closed position, the engagement slot is aligned with the engagement shoulder.

The locking mechanism situates the flap at an unlocked position and a locked position. When the flap is at the unlocked position, an animal has access to the through-way. When the flap is at the locked position, an animal does not have access to the through-way. More specifically, the locking mechanism situates the flap at the unlocked position by situating the flap at the less tapered portion of the through-way such that the flap pivots between the closed position and the open position, as discussed above, without being restricted by the frame. The locking mechanism situates the flap at the locked position by situating the flap at the most tapered portion of the through-way such that the engagement shoulder is received by the engagement slot. When the engagement shoulder is received by the engagement slot, the engagement shoulder restricts the flap to the closed position regardless of a lateral force applied at the flap.

The electronic pet door includes a receiver in electrical communication with the locking mechanism and a transmitter in wireless communication with the receiver and carried by the selected animal. When the receiver does not receive the signal transmitted by the transmitter, that is, when the distance between the transmitter and the receiver is too large, the locking mechanism situates the flap at the locked position, denying access to the through-way. Conversely, when the receiver receives the signal transmitted by the transmitter, that is, when the selected animal approaches the receiver disposed at the frame, the locking mechanism situates the flap at the unlocked position, granting the selected animal access to the through-way.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
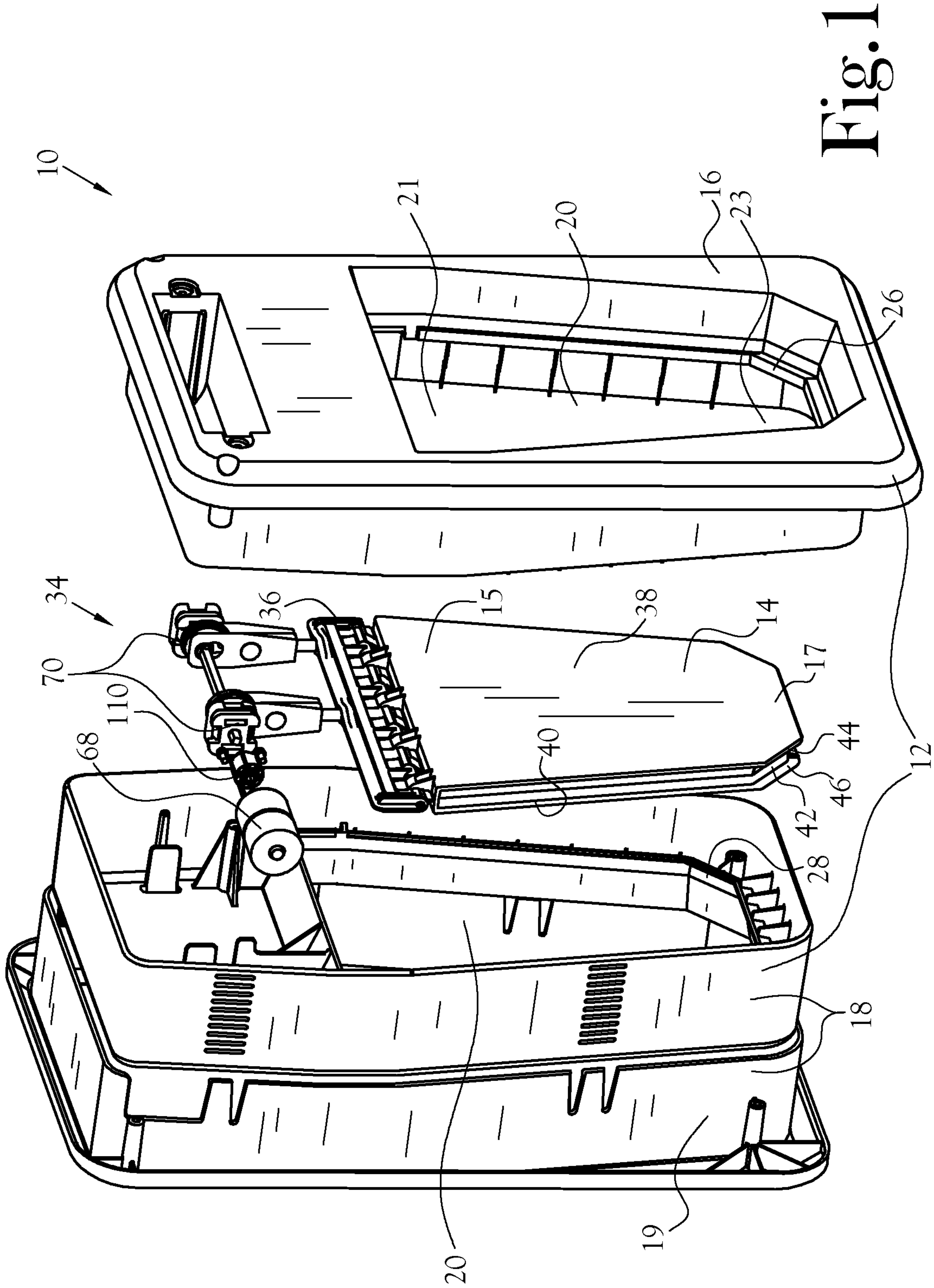
FIG. 1 illustrates an exploded view of one embodiment of the electronic pet door in accordance with the various features of the present invention.

One embodiment of an electronic pet door for automatically granting a selected animal access to a through-way defined by the electronic pet door and denying a non-selected animal access to the through-way and constructed in accordance with the various features of the present invention is illustrated generally at 10 in FIG. 1. The electronic pet door

10 includes a frame 12 and a flap 14. The frame 12 includes a first frame member 16 and a second frame member 18. The first frame member 16 includes a first shoulder member 26, and the second frame member 18 includes a second shoulder member 28. The first frame member 16 is mechanically secured to the second frame member 18 such that the frame 12 defines a through-way 20.

Figure 2:
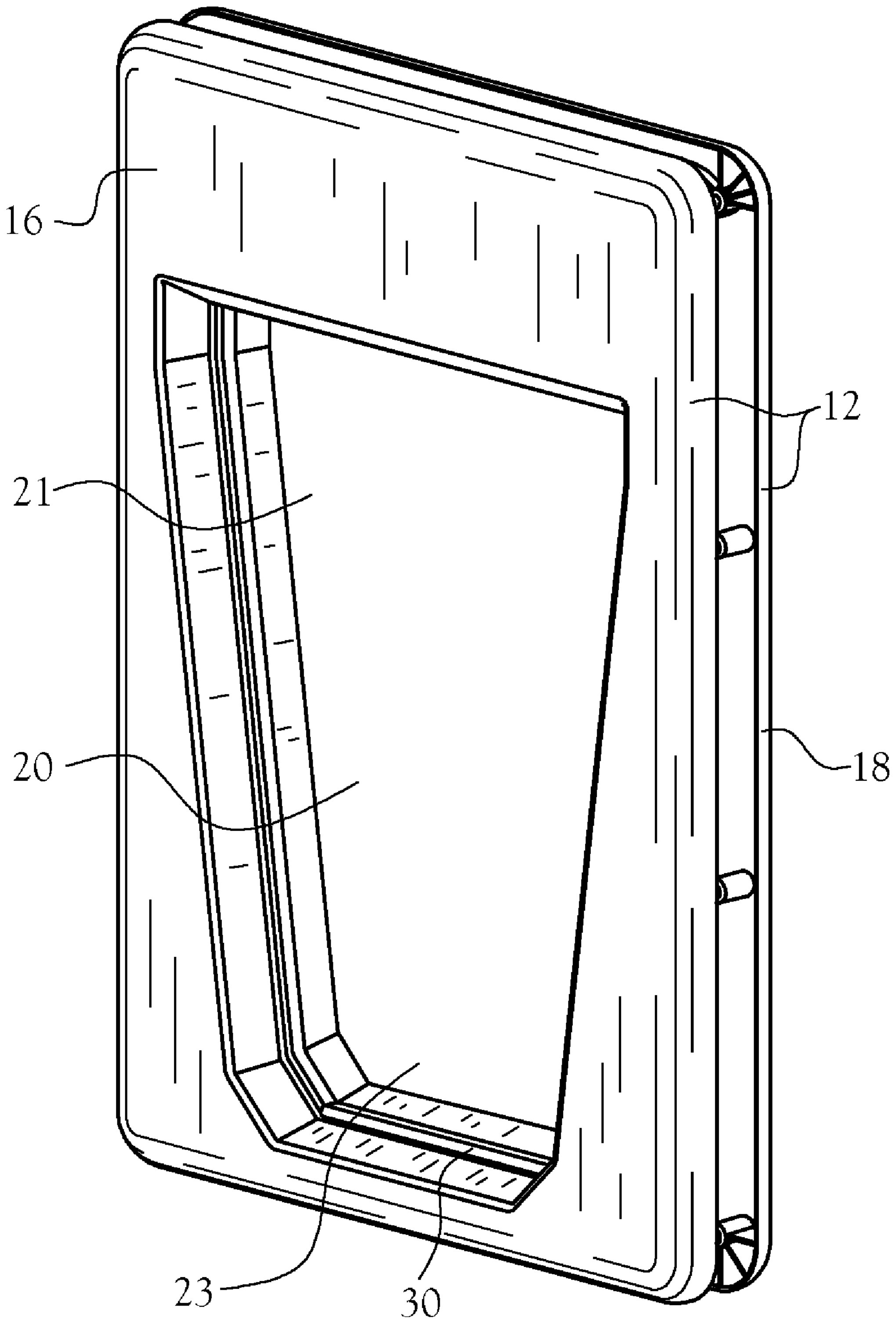
FIG. 2 illustrates the frame of the electronic pet door of FIG. 1.

FIG. 2 is a perspective view of one embodiment of the frame 12 and better illustrates the through-way 20. When the first frame member 16 is mechanically secured to the second frame member 18, the first shoulder member 26 and the second shoulder member 28 define an engagement shoulder 30. The first shoulder member 26 and the second shoulder member 28 are disposed at the first frame member 16 and the second frame member 18, respectively, such that the engagement shoulder 30 defines a portion of the through-way 20. The portions of the through-way 20 not defined by the engagement shoulder 30 are defined by portions of the frame 12 that do not include the engagement shoulder 30. The through-way 20 is substantially large to the extent that it provides a passage for a selected animal, the selected animal being subsequently defined. Additionally, the contour of the through-way 20 is tapered such that the through-way 20 includes a less tapered portion 21 and a most tapered portion 23. In the illustrated embodiment, the through-way 20 is longitudinally tapered from top to bottom. It should be noted that the through-way 20 can be tapered in accordance with the scope and spirit of the present invention without being longitudinally tapered from top to bottom, as is subsequently illustrated. It should also be noted that the frame 12 as illustrated at FIG. 2 does not include the flap 14 such that the through-way 20 is clearly illustrated.

Additionally, it should be noted that the frame 12 can be of adjustable depth without departing from the scope or spirit of the present invention. For example, in the illustrated embodiment of FIG. 1, the second frame member 18 includes an adjustable frame member 19.

Figure 3:
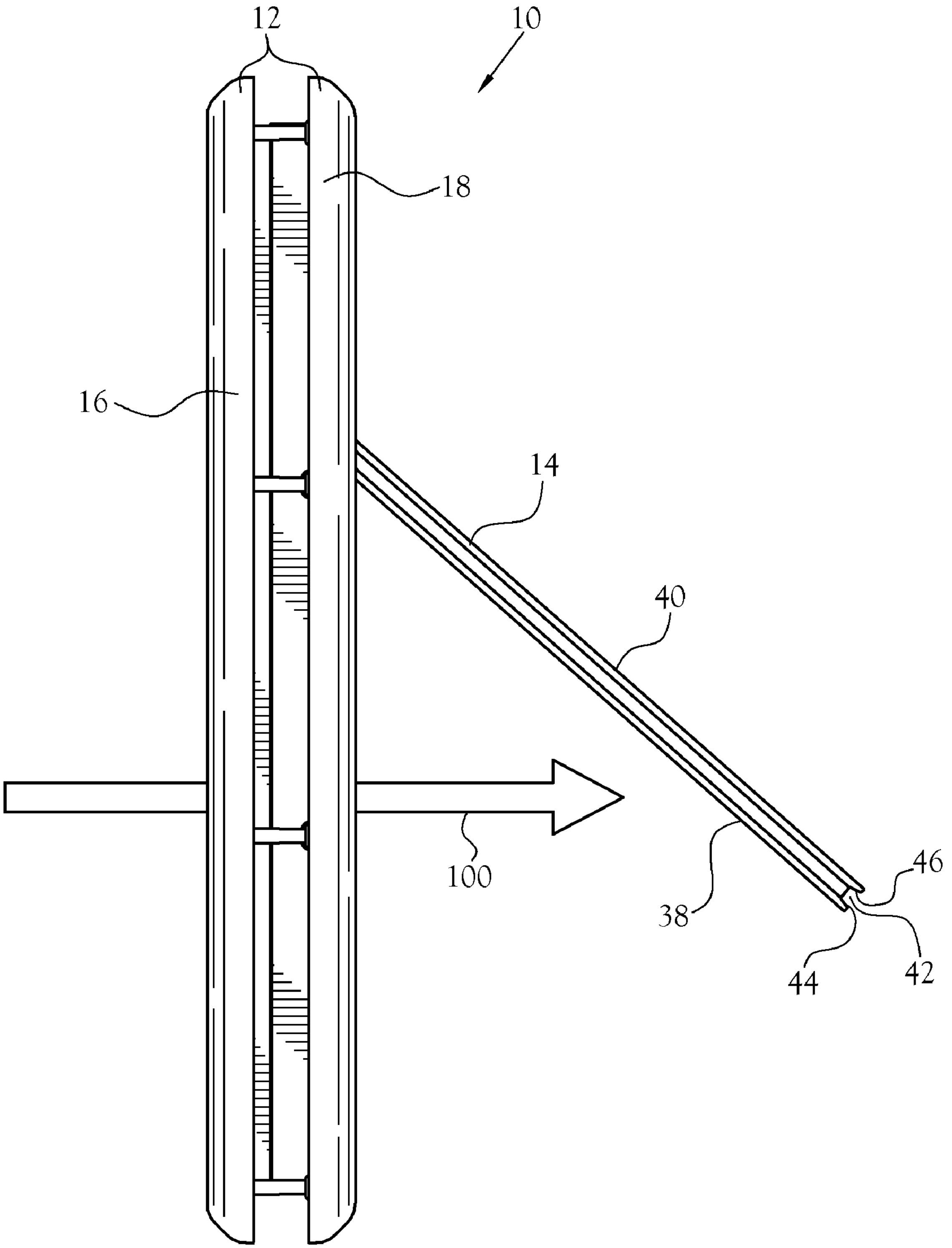
FIG. 3 illustrates the electronic pet door of FIG. 1 when the flap is at the open position.
Figure 4:
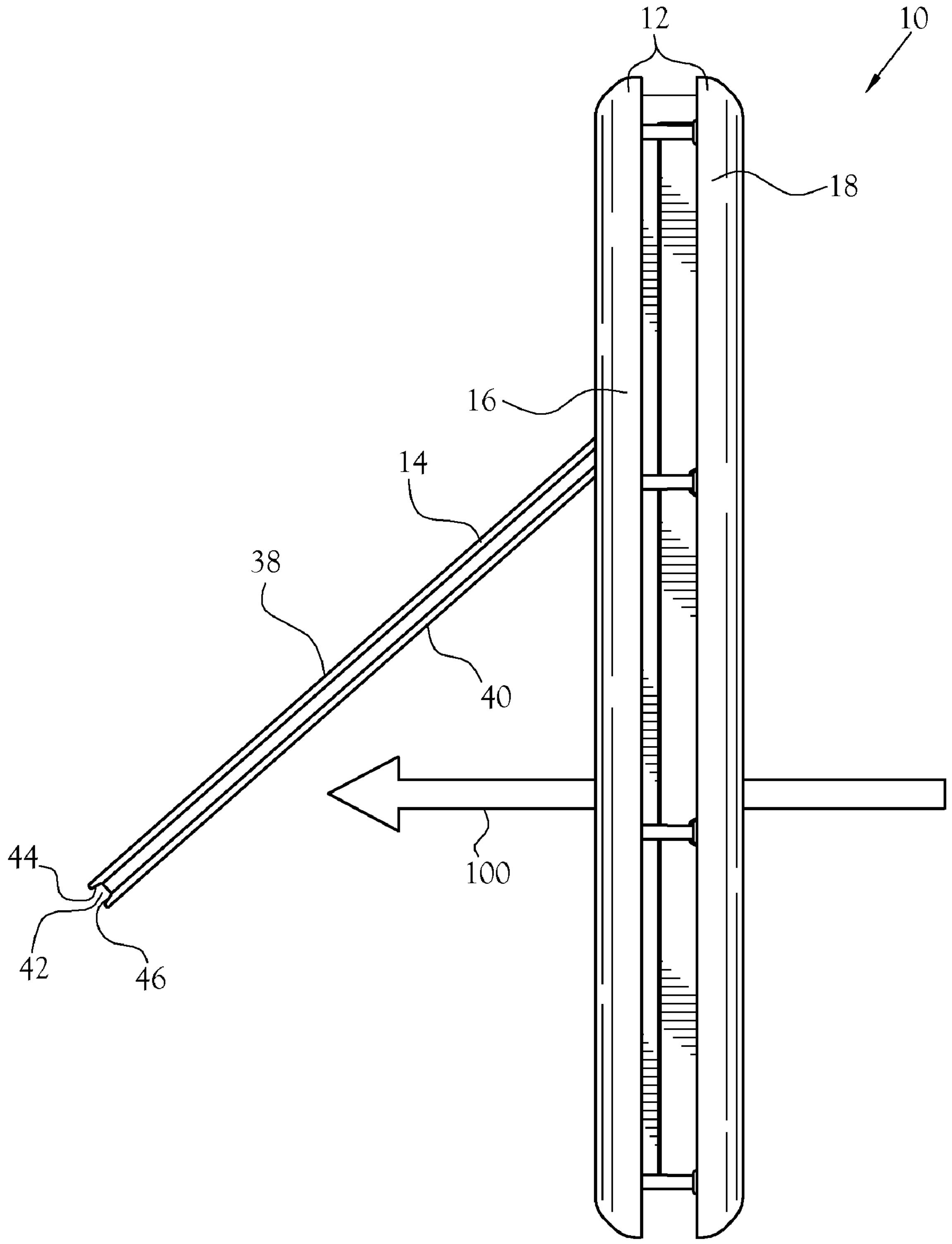
FIG. 4 illustrates the electronic pet door of FIG. 1 when the flap is at the open position in a direction opposite that of FIG. 3.
Figure 5:
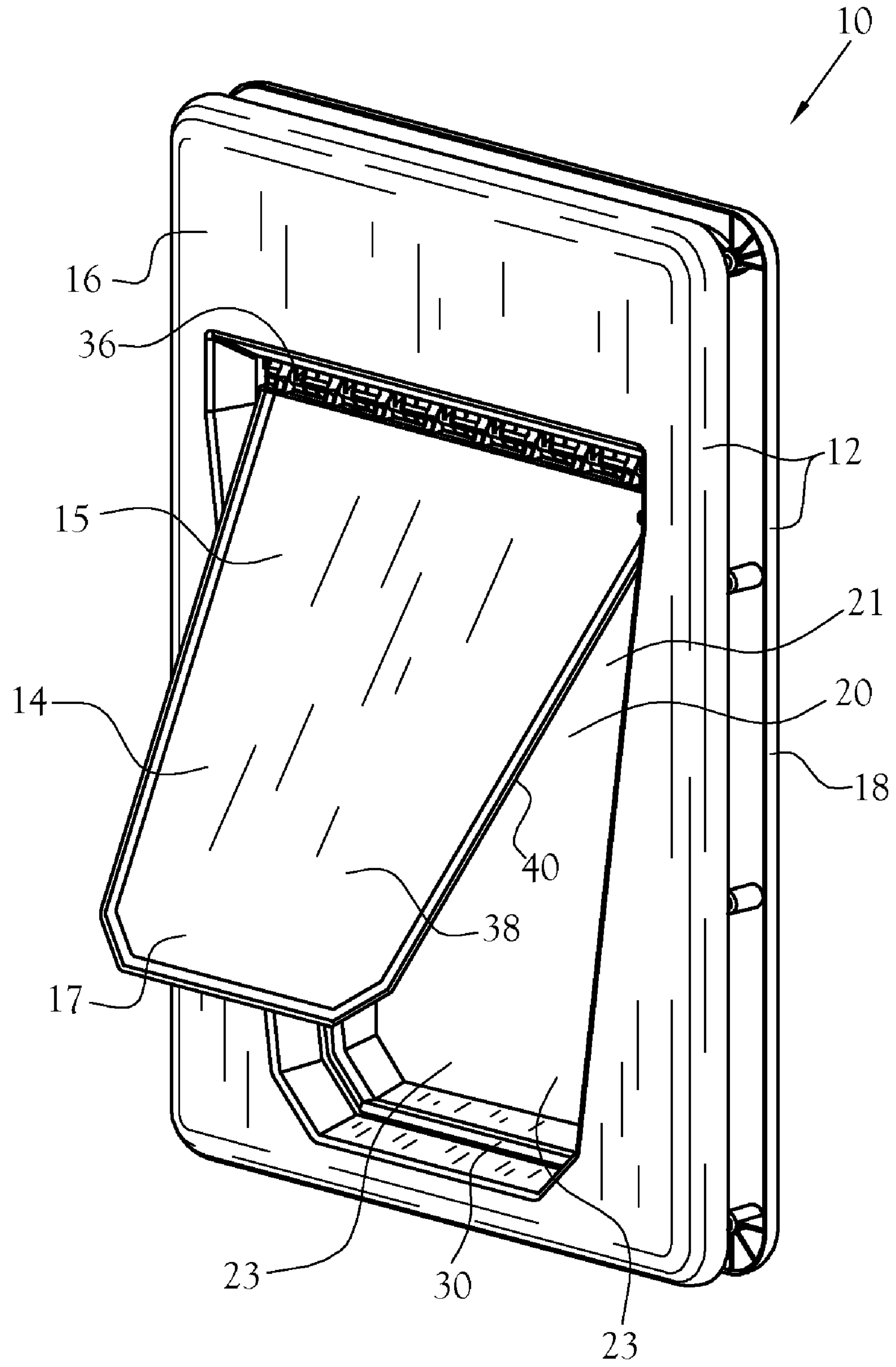
FIG. 5 is a perspective view of the electronic pet door of FIG. 1 when the flap is at the open position.
Figure 6:
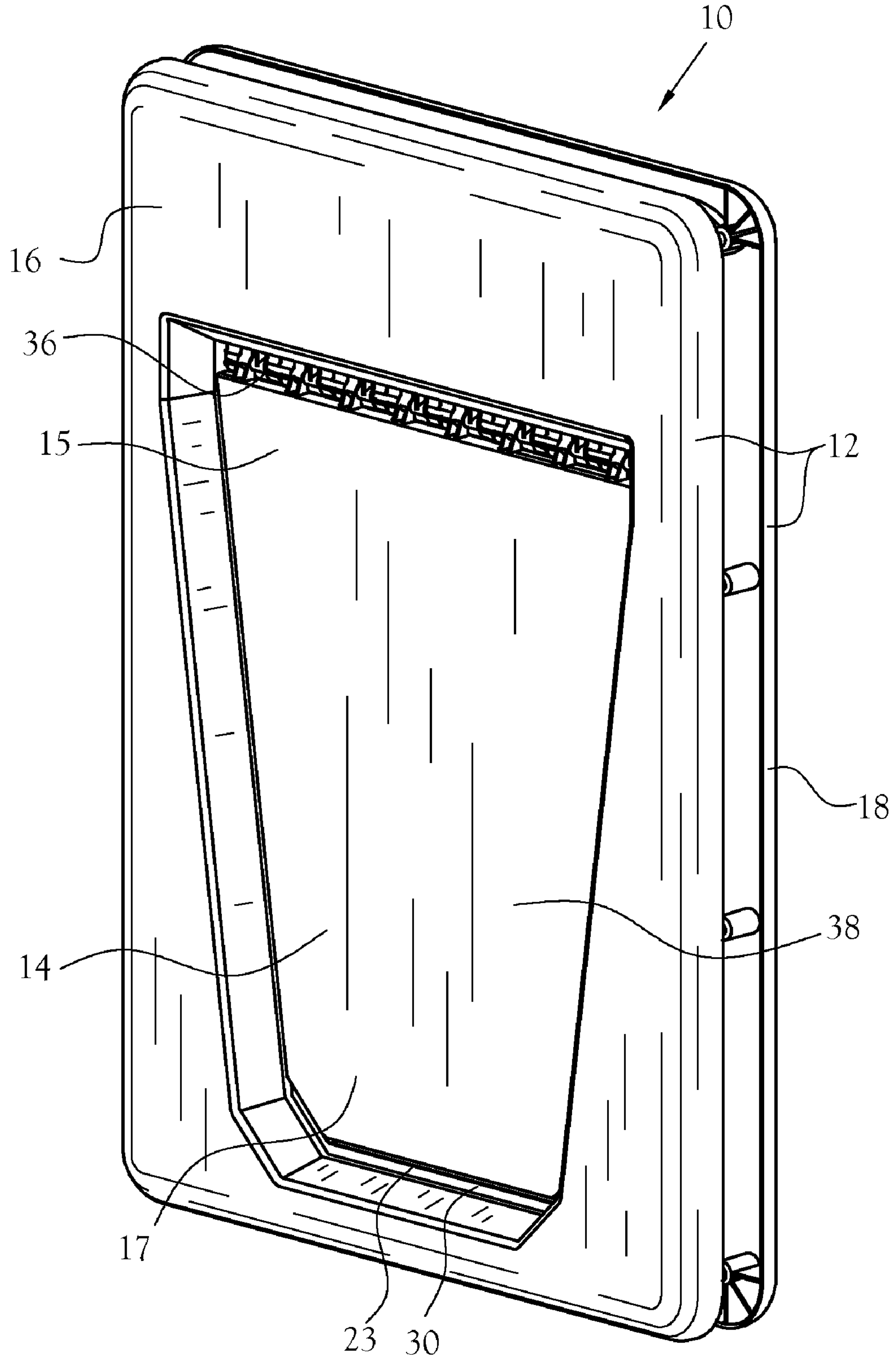
FIG. 6 illustrates the electronic pet door of FIG. 1 when the flap is at the closed position.
Figure 7A:
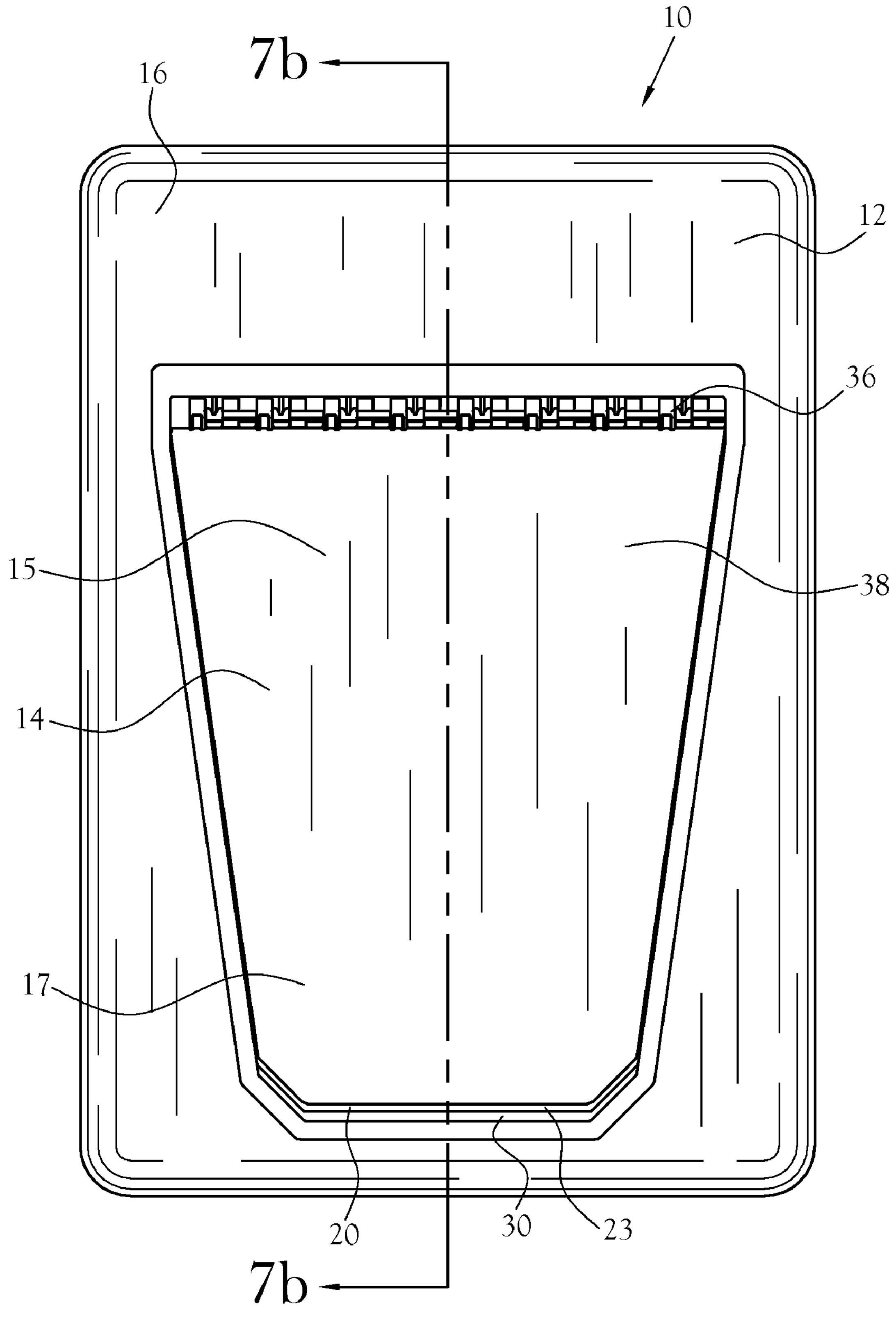
FIG. 7*a* illustrates the electronic pet door of FIG. 1 when the flap is at the unlocked position.
Figure 7B:
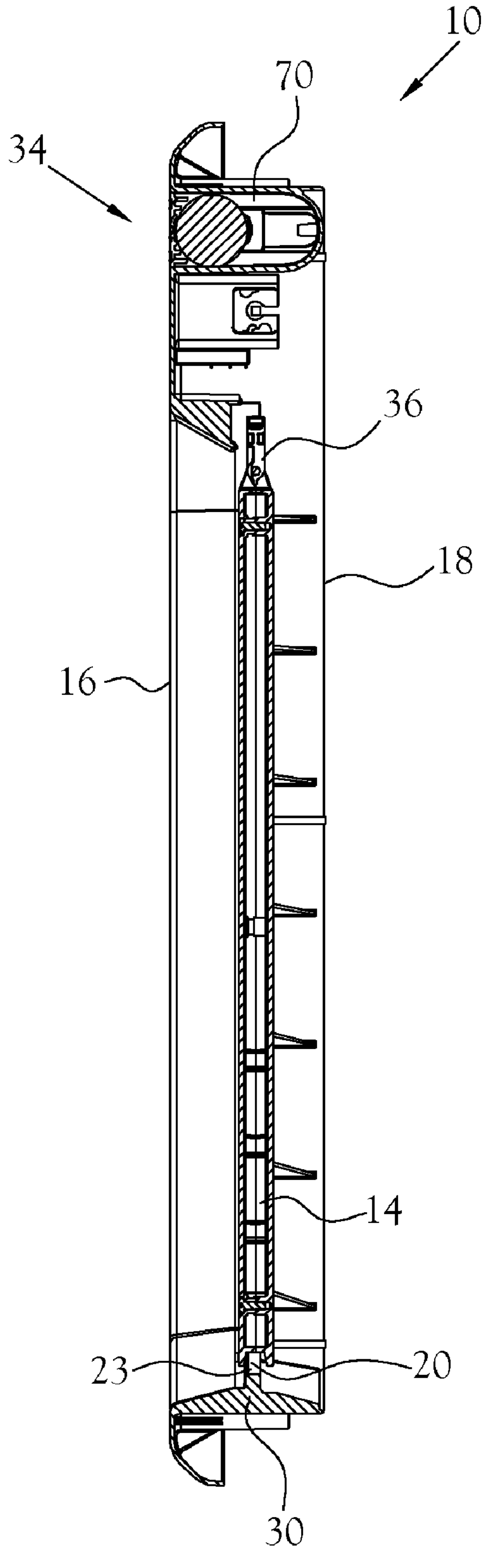
FIG. 7*b* is a cross section of FIG. 7*a*, further illustrating the electronic pet door when the flap is at the unlocked position.

Considering again FIG. 1, the flap 14 is constructed of a substantially rigid material, such as, but not limited to, a plastic, and includes a first side 38 and a second side 40 that is opposite the first side 38. Additionally, the flap 14 defines an engagement slot 42. The contour of the flap 14 is tapered to correspond with the contour of the through-way 20 such that the flap 14 includes a less tapered portion 15 and a most tapered portion 17. Consequently, in the illustrated embodiment, the flap 14 is longitudinally tapered from top to bottom. The flap 14 is disposed within the through-way 20 such that the contour of the flap 14 is substantially aligned with the corresponding contour of the through-way 20 and such that the first side 38 is in the direction of the first frame member 16 and the second side 40 is in the direction of the second frame member 18. The less tapered portion 15 of the flap 14 is secured to a hinge member 36, which is secured to a locking mechanism 34, which is housed by the frame 12 at the less tapered portion 21 of the through-way 20. The flap 14 pivots bi-directionally at the hinge member 36 in response to a lateral force applied at the flap 14; the lateral force including an animal laterally pushing against the flap 14. More specifically, as illustrated at FIG. 3, when a lateral force 100 is applied at the first side 38 of the flap 14, the flap 14 pivots at the hinge member 36 in the direction of the second frame member 18. Similarly, as illustrated at FIG. 4, when a lateral force 100 is applied at the second side 40 of the flap 14, the flap 14 pivots at the hinge member 36 in the direction of the first frame member 16. Accordingly, the flap 14 is capable of an open position and a closed position. The flap 14 is at the open position when it pivots at the hinge member 36 to the extent that the engagement slot 42 defined by the flap 14 is not aligned with the previously discussed engagement shoulder 30 defined by the frame 12. The flap 14 is at the closed position when the engagement slot 42 is aligned with the engagement shoulder 30. The previously discussed FIG. 3 and FIG. 4 illustrate the flap 14 at the open position. Additionally, FIG. 5 is a perspective view of the electronic pet door 10 with the flap 14 at the open position. FIG. 6 illustrates the flap 14 at the closed position.

In the illustrated embodiment of the electronic pet door 10, to ensure that the flap 14 is at the closed position when a lateral force is not applied at the flap 14, the frame 12 is disposed such that gravity forces the flap 14 to the closed position when a lateral force is not applied. Alternatively, in another embodiment, the electronic pet door 10 includes a mechanical device that forces the flap 14 to the closed position when a lateral force is not applied at the flap 14. For example, in one embodiment, the hinge member 36 includes at least one spring that forces the flap 14 to the closed position when a lateral force is not applied at the flap 14. It should be noted that a mechanical device other than a spring can be used to force the flap 14 to the closed position in the absence of a lateral force without departing from the scope or spirit of the present invention. Additionally, it should be noted that the hinge member 36 includes any device or structure that permits the flap 14 to pivot at the hinge member 36 such that the flap 14 is capable of the open position and the closed position. In one embodiment, the electronic pet door 10 includes a position sensor that indicates when the flap 14 is at the closed position. The position sensor can be any sensor that detects the position of the flap 14 with respect to the closed position without departing from the scope or spirit of the present invention. For example, in one embodiment of electronic pet door 10, the position sensor is a reed switch disposed at the frame 12 and closed by a magnet disposed at the flap 14. The relevance of the position sensor with respect to the present invention is subsequently discussed.

Considering again FIG. 1, the locking mechanism 34 mechanically situates the flap 14 at an unlocked position and a locked position. The flap 14 is at the unlocked position when the locking mechanism 34 situates the flap 14 at the less tapered portion 21 of the through-way 20 such that the flap 14 pivots between the open position and the closed position as discussed above without being restricted by the frame 12. FIG. *7a* illustrates one embodiment of the electronic pet door 10 with the flap 14 at the unlocked position. FIG. *7b* illustrates a cross section of one embodiment of the electronic pet door 10, further illustrating the flap 14 at the unlocked position. It should be noted that when the flap 14 is at the unlocked position, an animal has access to the through-way 20 because the animal can apply a lateral force at the flap 14, moving the flap 14 to the open position.

Figure 8A:
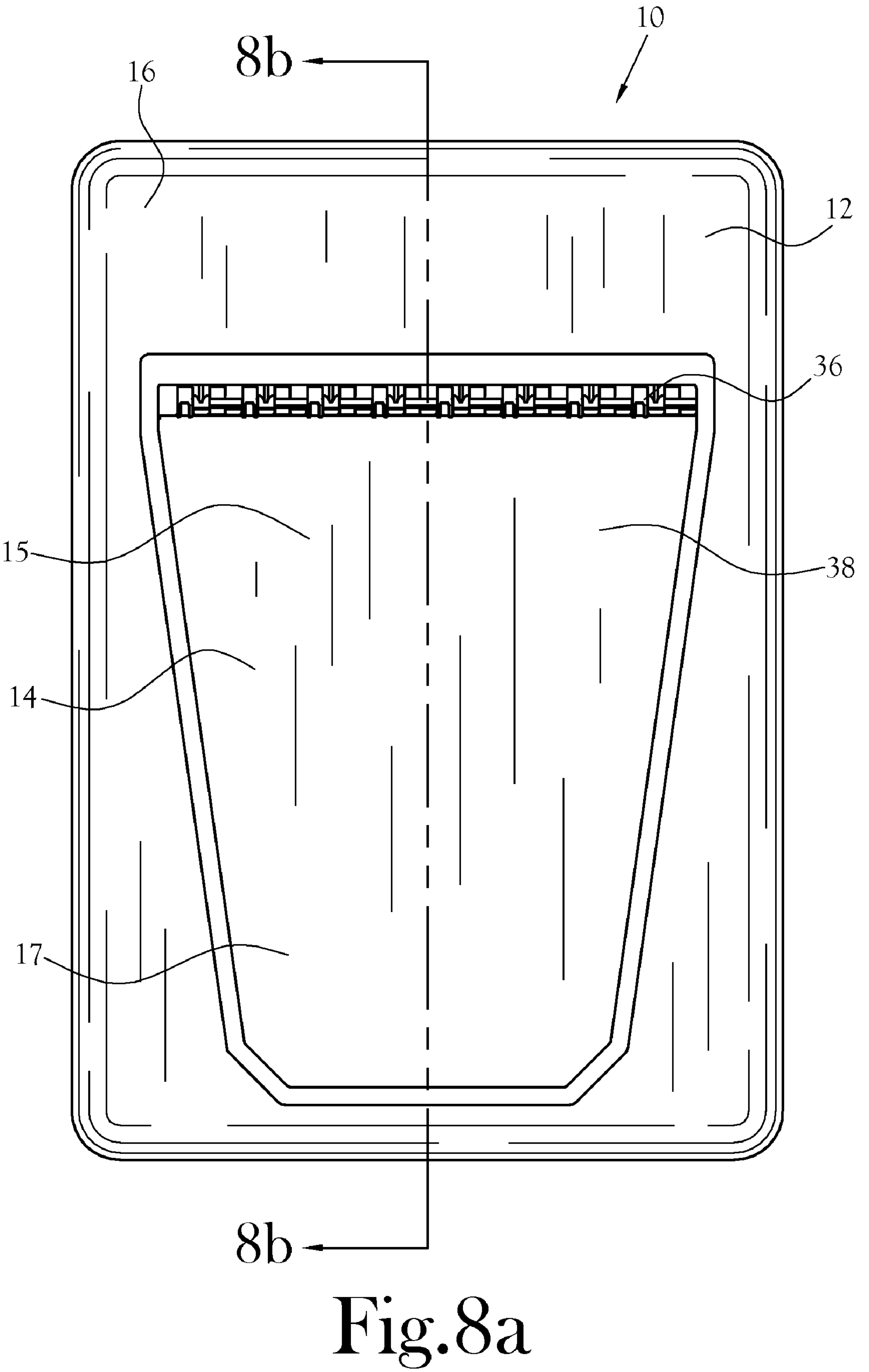
FIG. 8*a* illustrates the electronic pet door of FIG. 1 when the flap is at the locked position.
Figure 8B:
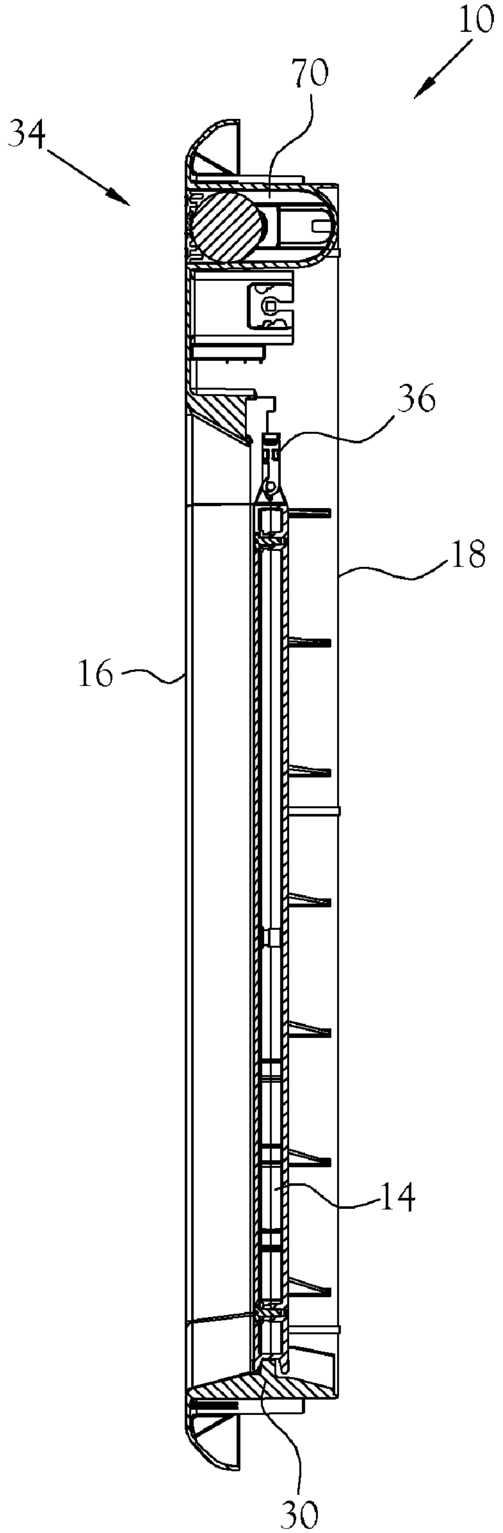
FIG. 8*b* is a cross section of FIG. 8*a*, further illustrating the electronic pet door when the flap is at the locked position.

The flap 14 is at the locked position when the flap 14 is at the closed position and the locking mechanism 34 situates the flap 14 at the most tapered portion 23 of the through-way 20 such that the engagement slot 42 of the flap 14 receives the engagement shoulder 30 of the frame 12. More specifically, the engagement slot 42 includes a first slot member 44 and a second slot member 46. The first slot member 44 is the portion of the first side 38 that defines the engagement slot 42. Similarly, the second slot member 46 is the portion of the second side 40 that defines the engagement slot 42. Stated differently, the engagement shoulder 30 is received by the engagement slot 42 when the engagement shoulder 30 occupies the void defined by the first slot member 44 and the second slot member 46. Stated differently, the engagement slot 42 and the engagement shoulder 30 cooperate as a tongue and groove configuration. When at the locked position, the flap 14 does not move from the closed position regardless of lateral forces applied at the flap 14. More specifically, when at the locked position, the engagement slot 42 receives the engagement shoulder 30 such that when a lateral force is applied at the first side 38 of the flap 14, the first slot member 44 engages the first shoulder member 26 such that the first shoulder member 26 prevents the flap 14 from moving from the closed position. Similarly, when a lateral force is applied at the second side 40 of the flap 14, the second slot member 46 engages the second shoulder member 28 such that the second shoulder member 28 prevents the flap 14 from moving from the closed position. FIG. **8*a* illustrates one embodiment of the electronic pet door 10 with the flap 14 at the locked position. FIG. 8*b* illustrates a cross section of one embodiment of the electronic pet door 10, further illustrating the flap 14 at the locked position. It should be noted that when the flap 14 is at the locked position, an animal does not have access to the through-way 20**.

It should be noted that the locked position of the electronic pet door 10 can include engagement schemes other than the illustrated engagement scheme without departing from the scope or spirit of the present invention. For example, in one embodiment of the electronic pet door 10, the frame 12 defines a flap slot that receives a portion of the flap 14 to the extent that the flap 14 is restricted to the closed position. Consequently, when the flap slot receives the portion of the flap 14, the flap 14 is at the locked position.

Figure 9:
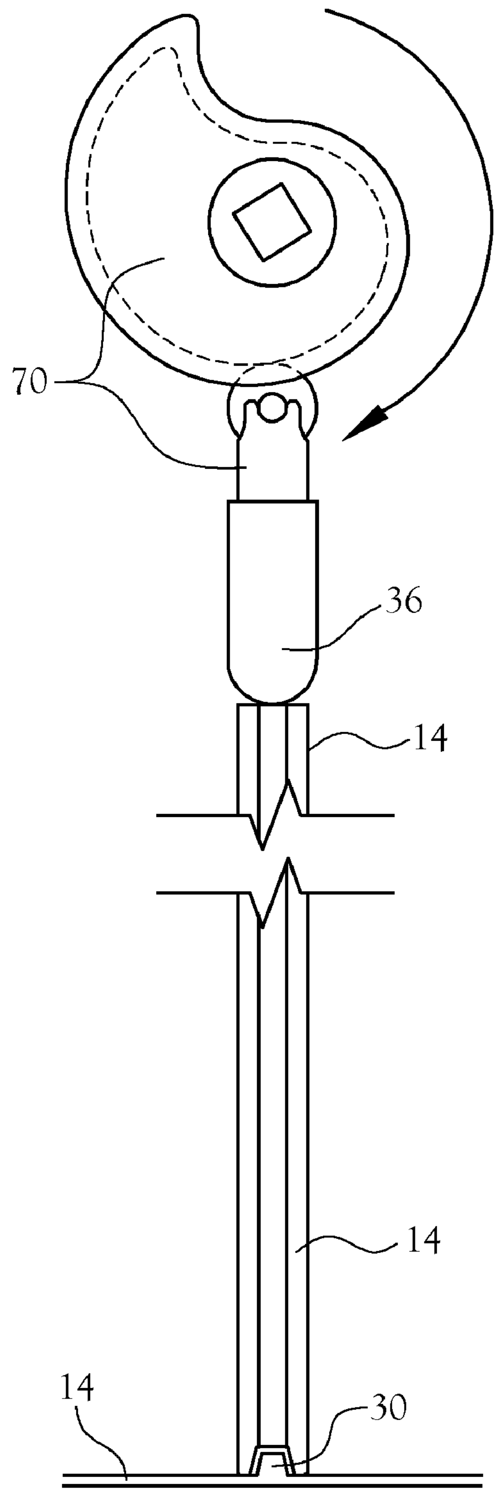
FIG. 9 illustrates the locking mechanism of FIG. 1 when the flap is at the locked position.
Figure 10:
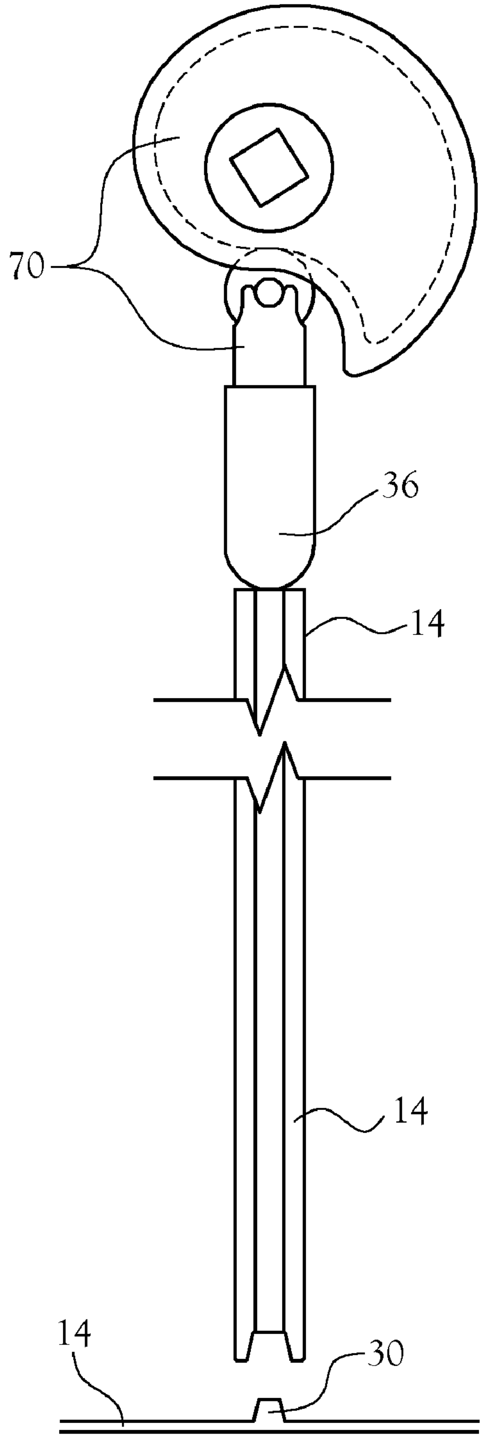
FIG. 10 illustrates the locking mechanism of FIG. 1 when the flap is at the unlocked position.

The locking mechanism 34 mechanically situates the flap 14 at the unlocked position and the locked position by physically shifting the flap 14 between the less tapered portion 21 of the through-way 20 and the most tapered portion 23 of the through-way 20. Additionally, the locking mechanism 34 situates the flap 14 at the locked position such that only an affirmative action by the locking mechanism 34 can shift the flap 14 to the unlocked position. Stated differently, the flap 14 cannot be forced from the locked position to the unlocked position by, for example, and an intruder. In the illustrated embodiment of FIG. 1, the locking mechanism 34 includes an electric motor 68 and at least one cam 70 such that the electric motor 68 drives the at least one cam 70 to the extent that the locking mechanism 34 longitudinally shifts the flap 14 upward and downward between the less tapered portion 21 of the through-way 20 and the most tapered portion 23 of the through-way 20. Additionally, the flap 14 is only shifted from the locked position to the unlocked position when the cam 70 is displaced such that an affirmative action by the locking mechanism 34 is required to shift the flap 14 to the unlocked position. FIG. 9 illustrates the cam 70 of FIG. 1 when the flap 14 is at the locked position. FIG. 10 illustrates the cam 70 of FIG. 1 when the flap 14 is at the unlocked position. It should be noted that the locking mechanism 34 can be any mechanism capable of physically shifting the flap 14 without departing from the scope or spirit of the present invention.

Figure 11:
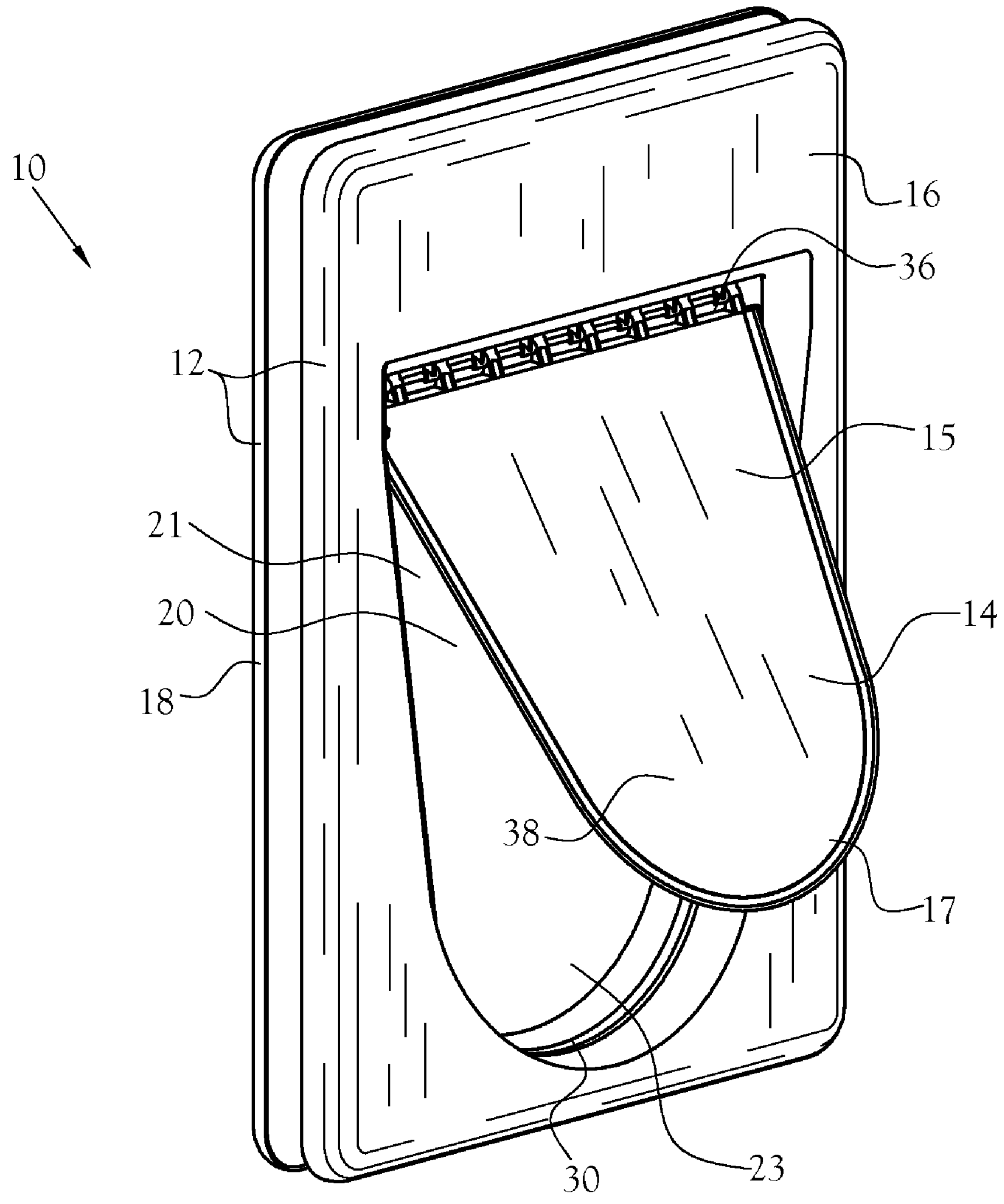
FIG. 11 illustrates an alternate embodiment of the electronic pet door in accordance with the various features of the present invention.

FIG. 11 illustrates an alternate embodiment of the electronic pet door 10. In the alternate embodiment, the through-way 20 is longitudinally tapered from left to right. Accordingly, the flap 14 is longitudinally tapered from left to right. Additionally, the through-way 20 and the flap 14 include respective contours that have softer angles than the respective contours of the above-illustrated through-way 20 and flap 14. It should be noted that the through-way 20 and the flap 14 can include respective contours other than the illustrated contours without departing from the scope or spirit of the present invention. Additionally, it should be noted that the through-way 20 and the flap 14 can be tapered in directions other than the illustrated directions without departing from the scope or spirit of the present invention.

Figure 12:
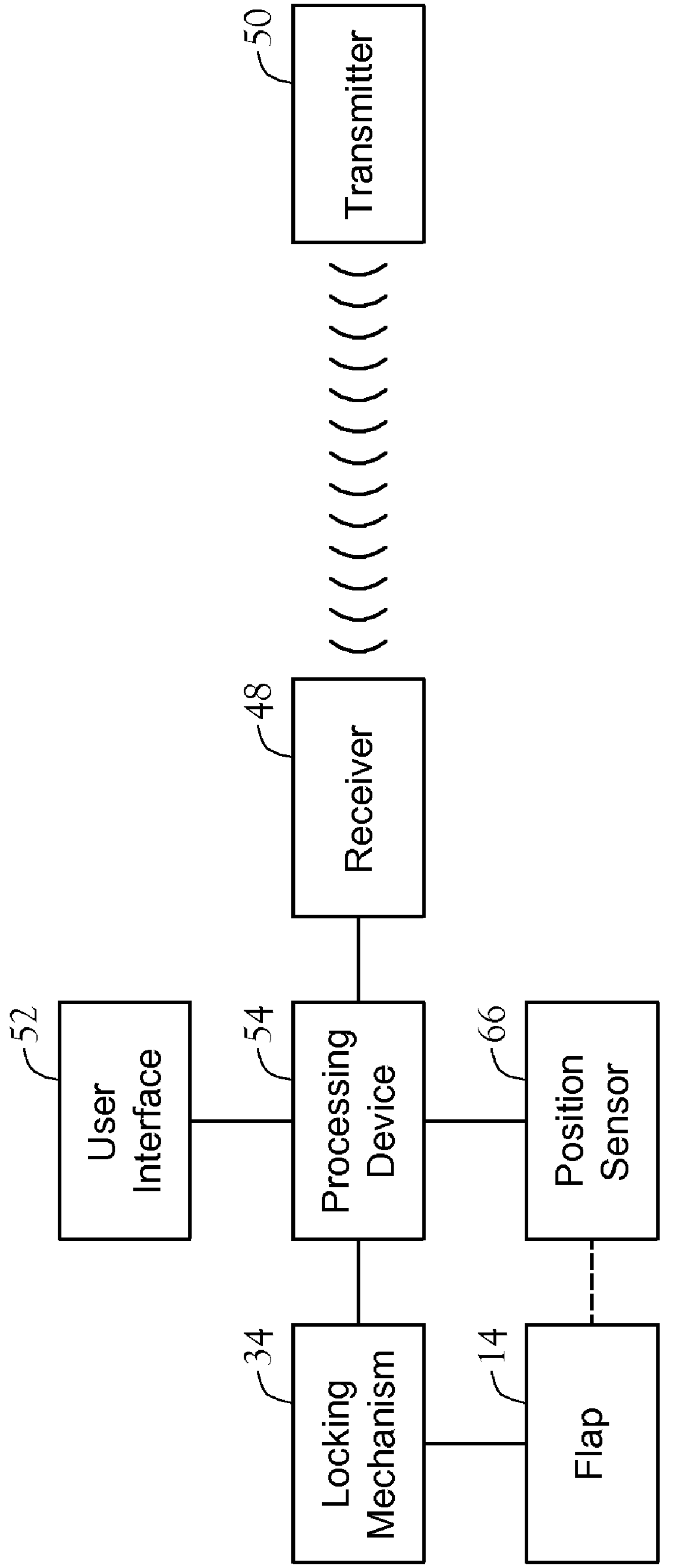
FIG. 12 is a block diagram of one embodiment of the electronic pet door in accordance with the various features of the present invention.
Figure 13:
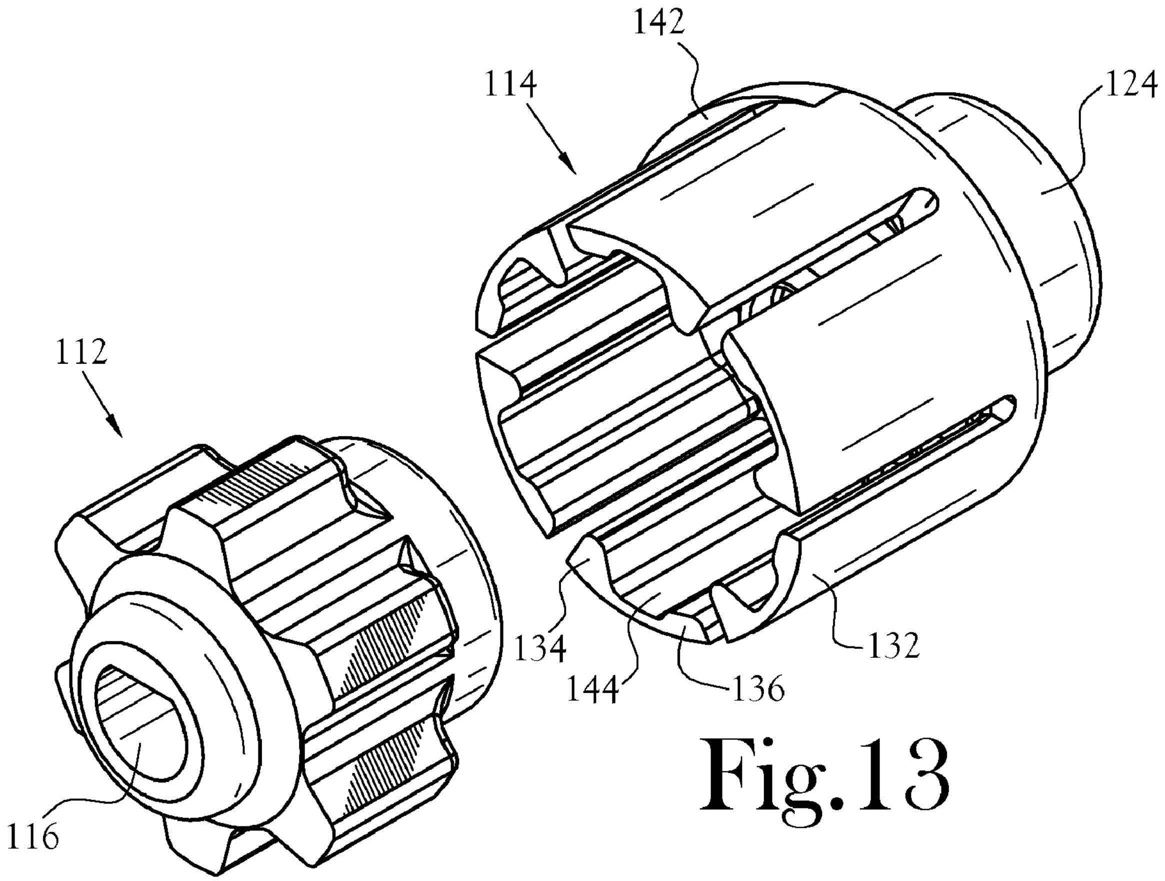
FIG. 13 is an exploded view of the clutch of the locking mechanism.
Figure 14:
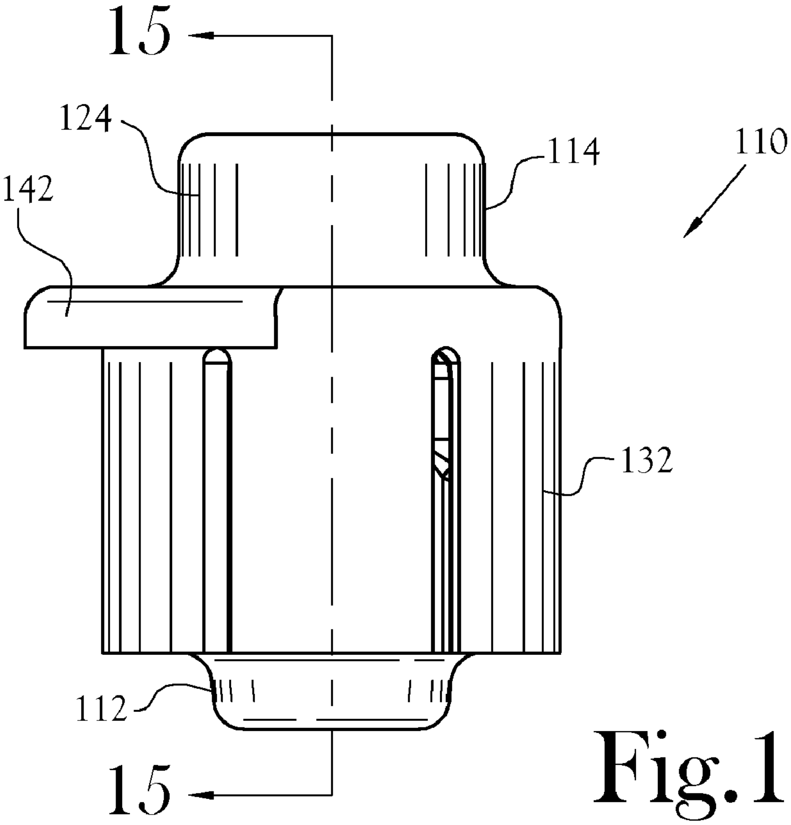
FIG. 14 is a side elevation view of the clutch of the locking mechanism.
Figure 15:
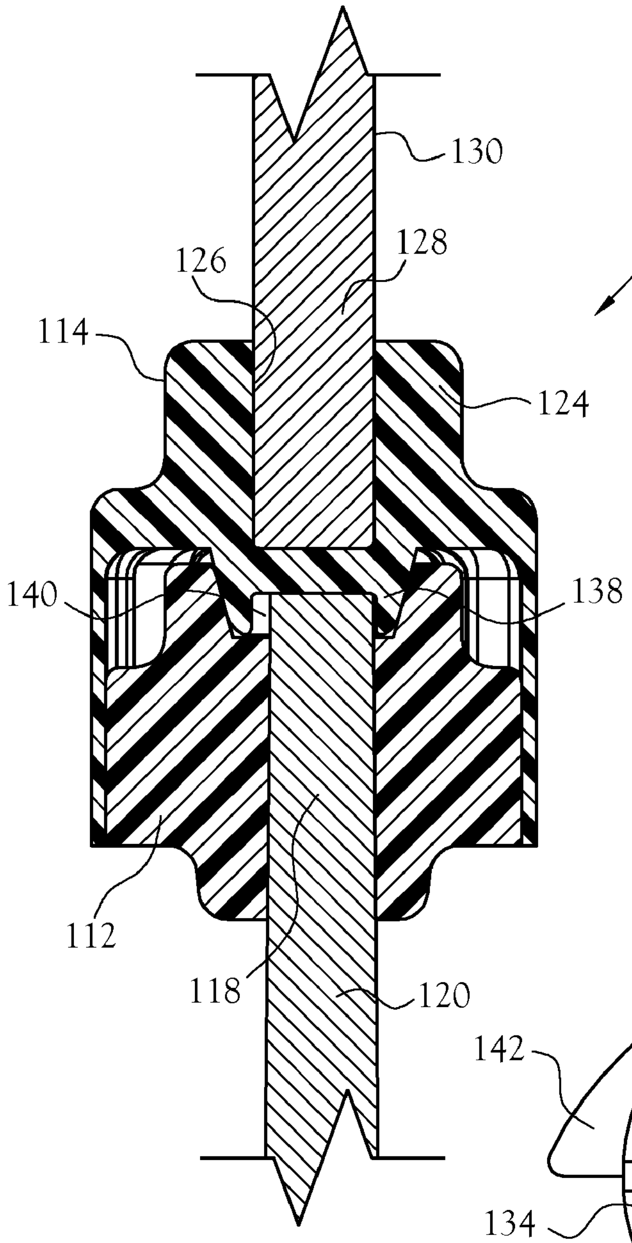
FIG. 15 is a cross section of the clutch of FIG. 14.
Figure 16:
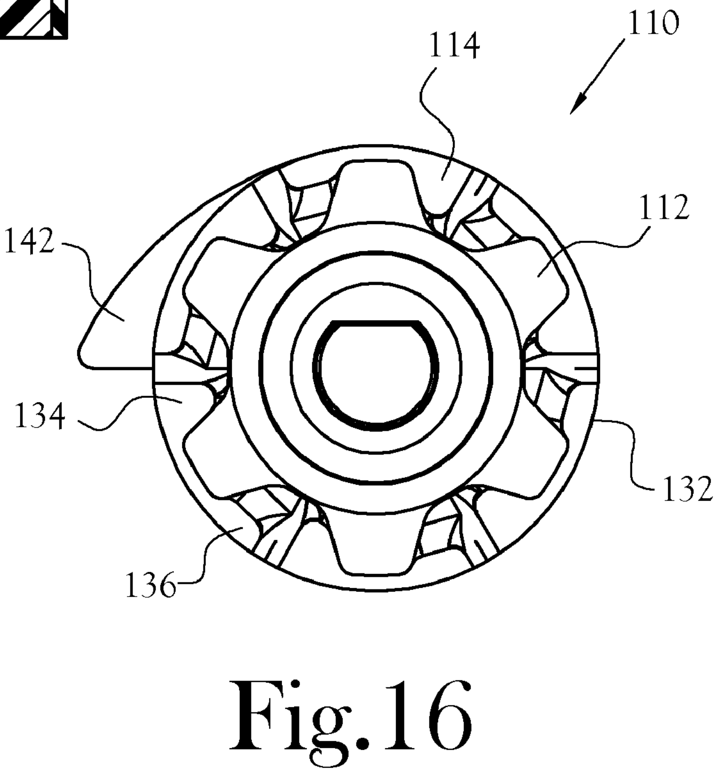
FIG. 16 is a plan view of the clutch of the locking mechanism.

FIG. 12 is a block diagram of one embodiment of the electronic pet door 10 in accordance with the various features of the present invention. In the illustrated embodiment, the electronic pet door 10 includes a receiver 48, a transmitter 50, a user interface 52, a processing device 54, and the previously discussed position sensor at 66. The processing device 54 is disposed within the frame 12 and is in electrical communication with the position sensor 66, the receiver 48, the user interface 52, and the locking mechanism 34, which, as previously discussed, is mechanically engaged with the flap 14. The user interface 52 is disposed at the frame 12 and includes various controls and displays that facilitate communication between the user of the electronic pet door 10 and the electronic pet door 10. For example, the user interface 52 allows the user to activate and deactivate the electronic pet door 10 and/or select the mode of operation. It should be noted that the user interface 52 can include any combination of controls, such as buttons, switches, and radial dials, without departing from the scope or spirit of the present invention. Additionally, it should be noted that the user interface 52 can include any display, such as LEDs and LCD displays, without departing from the scope or spirit of the present invention. The position sensor 66 is also disposed at the frame 12 such that it detects the position of the flap 14 with respect to the closed position. When the position sensor 66 detects that the flap 14 is at the closed position, it generates a closed position signal that is received by the processing device 54. The receiver 48 is also disposed at the frame 12 and is in wireless communication with the transmitter 50, which is carried by the selected animal; the selected animal being an animal that carries the transmitter 50. Conversely, a non-selected animal is an animal that does not carry the transmitter 50.

In one embodiment, the electronic pet door 10 includes three modes of operation, namely a locked mode, an unlocked mode, and an automatic mode. The user selects the current mode of operation by way of the user interface 52. When the electronic pet door 10 operates in the locked mode, the processing device 54 causes the locking mechanism 34 to always situate the flap 14 at the locked position, as it is defined above. Consequently, when operating in the locked mode, the electronic pet door 10 always denies both the selected animal and the non-selected animal access to the through-way 20. Similarly, when the electronic pet door 10 operates in the unlocked mode, the processing device 54 causes the locking mechanism 34 to always situate the flap 14 at the unlocked position, as it is defined above. Consequently, when operating in the unlocked mode, the electronic pet door 10 always grants both the selected animal and the non-selected animal access to the through-way 20.

When the electronic pet door 10 operates in the automatic mode, the processing device 54 causes the locking mechanism 34 to situate the flap 14 in the locked position until the selected animal approaches the through-way 20. When the selected animal approaches the through-way 20, the processing device 54 causes the locking mechanism 34 to shift the flap 14 to the unlocked position, granting the selected animal access to the through-way 20. Additionally, after the selected animal accesses the through-way 20, the processing device 54 causes the locking mechanism 34 to return the flap 14 to the locked position. Conversely, when the non-selected animal approaches the through-way 20, the processing device 54 does not cause the locking mechanism 34 to shift the flap 14 to the unlocked position, denying the non-selected animal access to the through-way 20. More specifically, the selected animal carries the transmitter 50, which transmits a presence signal that radiates from the transmitter 50. The receiver 48 is responsive to the presence signal when the intensity of the presence signal satisfies a specified intensity threshold. Consequently, when the transmitter 50 is within a particular distance from the receiver 48, the particular distance being defined by the specified intensity threshold, the receiver 48 responds to the presence signal transmitted by the transmitter 50. More specifically, the receiver 48 responds to the presence signal by generating a detection signal that is received by the processing device 54. When the processing device 54 receives the detection signal, the processing device 54 causes the locking mechanism 34 to situate the flap 14, which is otherwise at the locked position, at the unlocked position. Because the selected animal carries the transmitter 50, and the receiver 48 is disposed at the frame 12, which defines the through-way 20, when the selected animal approaches the through-way 20, the processing device 54 causes the locking mechanism 34 to shift the flap 14 to the unlocked position, granting the selected animal access to the through-way 20. After the selected animal accesses the through-way 20 or otherwise distances itself, and incidentally the transmitter 50, from the receiver to the extent that the presence signal no longer satisfies the specified intensity threshold at the receiver 48, the processing device 54 causes the locking mechanism 34 to situate the flap 14 at the locked position. Additionally, in the illustrated embodiment, the processing device 54 only causes the locking mechanism 34 to situate the flap 14 at the locked position when the processing device 54 receives the closed position signal from the position sensor 66.

On the other hand, when the selected animal is not approaching the through-way 20, i.e., is not within the designated distance from the receiver 48, the electronic pet door 10 denies access to the through-way 20. More specifically, when the specified intensity threshold at the receiver 48 is not satisfied by the presence signal, the processing device 54 causes the locking mechanism 34 to maintain the flap 14 at the locked position. For example, when a non-selected animal approaches and attempts to access the through-way 20, the electronic pet door 10 denies the non-selected animal such access.

It should be noted that the electronic pet door 10 can include modes of operation other than the locked mode, the unlocked mode, and the automatic mode without departing from the scope or spirit of the present invention. For example, one embodiment the electronic pet door 10 does not include the receiver 48 and the transmitter 50 and thus, does not include the automatic mode. Additionally, it should be noted that both the receiver 48 and the transmitter 50 can be transceivers without departing from the scope or spirit of the present invention.

In one embodiment of the electronic pet door 10, the flap 14 and the frame 12 generate a weatherproof seal when the flap 14 is at the locked position such that additional sealing structures, such as wipers, are not required. More specifically, when the engagement slot 42 receives the engagement shoulder 30, the engagement shoulder 30, the first slot member 44, and the second slot member 46 seal the through-way 20 such that environmental air, conditioned air, environmental moisture, and wind do not pass through the through-way 20. Additionally, in one embodiment, the flap 14 is constructed such that dead air is disposed between the first side 38 and the second side 40 such that the flap 14 acts as an insulator. Additionally, because the locking mechanism 34 only temporarily shifts the flap 14 to unlocked position to grant access to the through-way 20, structures such as wipers are not required to provide the electronic pet door 10 with a sufficient weatherproof seal.

One embodiment of the electronic pet door 10 includes a plurality of transmitters 50. Each of the plurality of transmitters 50 is carried by a respective animal such that there is a plurality of selected animals. As a result, for example, a pet owner who owns multiple pets can grant each pet access to a single through-way 20.

Another embodiment of the electronic pet door 10 provides a timed lock feature when the electronic pet door 10 is operating in the automatic mode. In accordance with the timed lock feature, the processing device 54 causes the locking mechanism 34 to situate the flap 14 at the locked position even when the receiver 48 is responding to the presence signal when the receiver 48 responds to the presence signal for a designated period of time. In other words, when the selected animal remains close enough to the through-way 20 to cause the locking mechanism 34 to situate the flap 14 at the unlocked position for a designated period of time, the processing device 54 causes the locking mechanism 34 to shift the flap 14 to the locked position. The timed lock feature causes the electronic pet door 10 to deny, for example, the non-selected animal access to the through-way 20 when the selected animal, for example, is resting near the through-way 20. After the timed lock feature is activated, the selected animal distances the transmitter 50 from the receiver 48 such that the intensity of the presence signal at the receiver 48 drops below the specified threshold to deactivate the timed lock feature. After the timed lock feature is deactivated, the electronic pet door 10 operates in the automatic mode as discussed above.

In yet another embodiment of the electronic pet door 10, the user adjusts the distance from the through-way 20 the selected animal is when the receiver 48 responds to the presence signal transmitted by the transmitter 50 carried by the selected animal. More specifically, the user, by way of the user interface 52, adjusts the presence signal intensity threshold at which the receiver 48 responds to the transmitter 50.

In another embodiment of the electronic pet door 10, the locking mechanism 34 includes a safety feature that prevents the locking mechanism 34 from situating the flap 14 at the locked position when an object is located between the flap 14 and the frame 12. For example, in the illustrated embodiment of FIG. 1, the locking mechanism includes a clutch 110 mechanically engaged with the electric motor 68 and the at least one cam 70. The clutch 110 is illustrated in considerable detail at FIGS. 13-16. The clutch 110 generally comprises a gear 112 and a receptor 114 and releasably couples an axially rotatable driving shaft to an opposed, coaxial driven shaft.

The gear 112 defines an axial, non-cylindrical slot 116 adapted to frictionally receive an end portion 118 of an elongated driving shaft 120. The distal end of the driving shaft 120 is secured to a motor, for example. The non-cylindrical slot 116 prevents rotation of the driving shaft 120 relative to the gear 112. The gear 112 includes a plurality of cogs 122 extending radially outwardly. In the depicted embodiment there are six cogs 122 equally spaced circumferentially around the gear 112.

The receptor 114 comprises a hub 124 which defines an axial non-cylindrical slot 126 adapted to frictionally receive an end portion 128 of an elongated driven shaft. The distal end of the driven shaft is secured to a gear, for example in a gearbox adapted to effect motion of a pet door, for example. The non-cylindrical slot 126 prevents rotation of the driven shaft relative to the receptor 114.

The receptor 114 further comprises a plurality of extension segments 132 which extend from the hub 124 in an opposite direction from the driven shaft 130. In the depicted embodiment there are six extension segments. The extension segments 132 are generally parallel to and equivalently spaced from the axis of the driving shaft 120 and the driven shaft 130.

The extension segments 132 are spaced apart to define a cavity adapted to matingly receive the gear 112.

Each of the extension segments 132 includes a first elongated shoulder 134 and a second elongated shoulder 136. The first elongated shoulder 134 and the second elongated shoulder 136 are circumferentially spaced apart to define a channel 144 adapted to receive a cog 122 therebetween. The first elongated shoulder 134 contacts more than one half of the side wall of the cog 122. The second elongated shoulder 136 is shorter than the first elongated shoulder and contacts less than on half of the side wall of the cog 122.

The receptor 114 further comprises an axial, cylindrical centering knob 138 adapted to matingly engage an axial, cylindrical centering cavity 140 defined in the gear 112.

The gear 112 and the receptor 114 comprise a material having sufficient rigidity to efficiently transfer rotational energy and also permit the extension segments 132 to flex when the driven shaft encounters resistance to rotation which is greater than a range of normal operation. A material which has been found effective for molding the gear 112 and the receptor 114 is an acetal copolymer sold under the trademark Celcon® by Ticona Engineering Polymers.

In operation, the gear 112, which is frictionally mounted upon the driving shaft 120, is inserted into the cavity defined by the extension segments 132 until the centering knob 138 is received within the centering cavity 140. Each of the cogs 122 of the gear 112 is slidingly received within a channel 144. Rotation of the driving shaft 120 effects rotation of the gear 112. In the case of a pet door application, wherein it is the closing of the door that may encounter unanticipated resistance, as by a tail, for example, rotation of the gear 112 is in a direction to cause contact against the second elongated shoulder 136.

In normal operation, there is a level of resistance to rotation by the receptor from friction, for example. The extension segments 132 are sufficiently rigid to overcome the normal ranges of resistance to rotation. However, if the receptor receives an unanticipated resistance to rotation, as would occur is an object were blocking movement of a pet door, for example, the extension segments 132 are sufficiently flexible to expand outwardly from the gear 112 and allow the cogs 122 to pass under the second elongated shoulders 136 until the cam 142 triggers a switch to stop rotation of the driving shaft 120.

Those skilled in the art will recognize that various and different materials may be used to form the gear 112 and receptor 114. Moreover, the flexibility required in any particular application will vary depending upon the range of rotational resistance which is normal and the acceptable sensitivity of the resistance. In addition to using other materials, it will be recognized that the relative heights of the elongated shoulders, the lengths of the extension segments and the thickness of the gear 112 may all be adjusted to develop more or less flexibility in response to rotational resistance.

Figure 17:
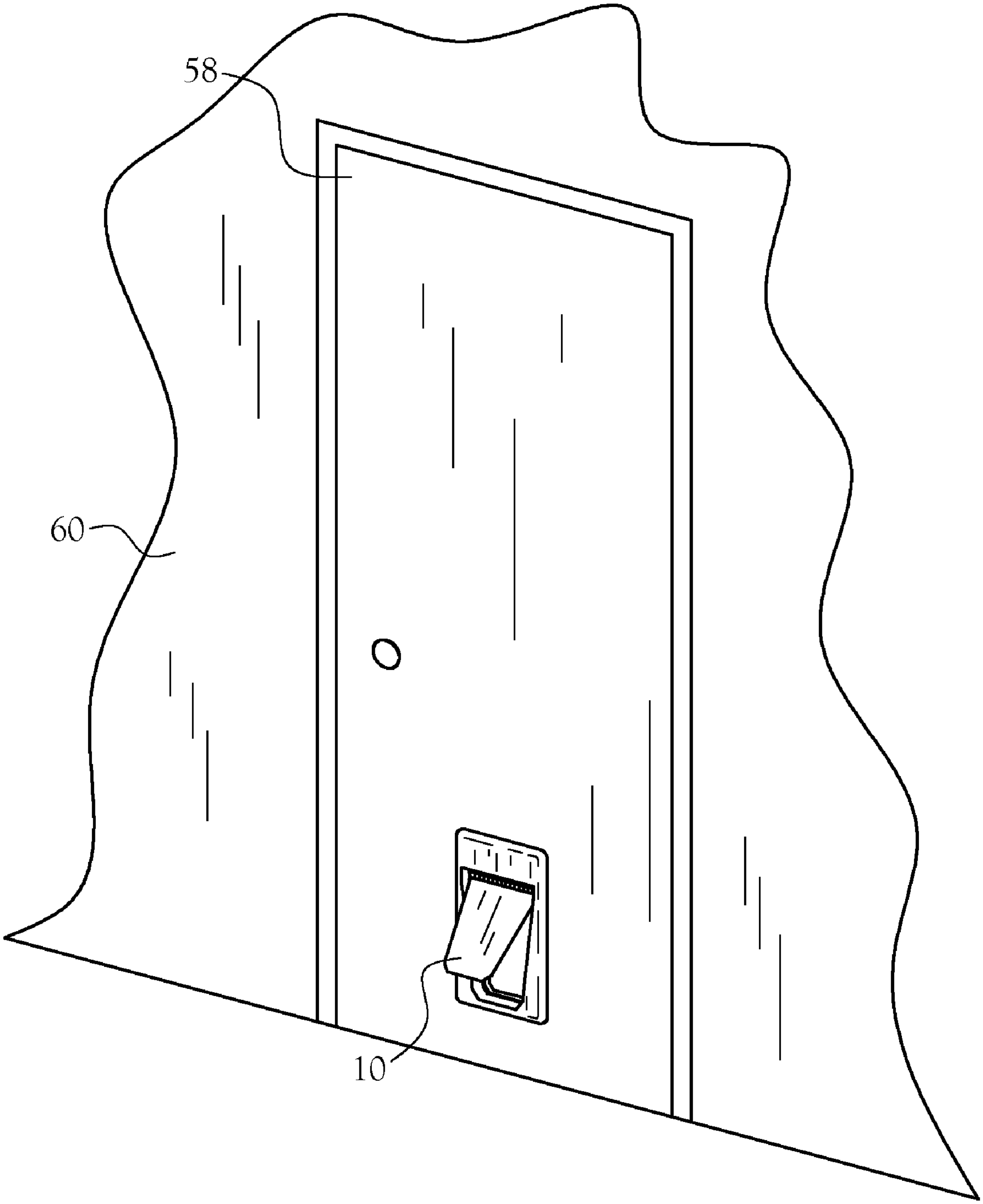
FIG. 17 illustrates one embodiment of the electronic pet door disposed at a structure.

The electronic pet door 10 is adapted to be disposed at a structure, such as a door or a wall, such that the through-way 20 provides a passage through the structure. For example, FIG. 17 illustrates one embodiment of the electronic pet door 10 disposed at a door 58 of a structure 60 that encloses an area to the extent that the structure 60 defines an inside and an outside. For example, the structure 60 includes a house. The electronic pet door 10 is disposed at the door 58 such that the first frame member 16 is at the outside face of the door 58 and the second frame member 18 is at the inside face of the door 58. Consequently, the through-way 20 defines a passage through the door 58. State differently, the through-way 20 provides an animal ingress and egress with respect to the structure 60. In accordance with the above-discussion, when the electronic pet door 10 operates in the automatic mode, the electronic pet door 10 provides the selected animal ingress and egress with respect to the structure 60 by way of the through-way 20 and denies the non-selected animal ingress and egress with respect to the structure 60.

From the foregoing description, those skilled in the art will recognize that an electronic pet door for granting selected animals access to a through-way and denying access to non-selected animals and weather conditions offering advantages over the prior art has been provided. The electronic pet door provides a tapered through-way and a correspondingly tapered flap disposed within the through-way. The flap is mechanically shifted between a locked position and an unlocked position by way of a locking mechanism. Further, the flap remains at the locked position, denying access to the through-way, until the selected animal approaches the through-way. Then, the flap is shifted to the unlocked position, granting the selected animal access to the through-way.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A pet door comprising:

a frame defining a through-way and an engagement shoulder, the through-way having a tapered contour, the engagement shoulder outlining a portion of the through-way;

a flap secured to said frame such that said flap pivots bi-directionally within the through-way to the extent that said flap is capable of a closed position and an open position, said flap defining an engagement slot and having a tapered contour corresponding to the tapered contour of the through-way; and a locking mechanism engaged with said flap, said locking mechanism situates said flap at a locked position and an unlocked position, when said flap is at the locked position, the engagement slot receives the engagement shoulder.

* * * * *